(12) United States Patent
Gavin

(10) Patent No.: US 6,460,860 B2
(45) Date of Patent: Oct. 8, 2002

(54) PIPE SEAL FOR CAST CONCRETE

(76) Inventor: Norman W. Gavin, 173 Church St., Wallingford, CT (US) 06492

( * ) Notice: Subject to any disclaimer, the term of this patent is extended or adjusted under 35 U.S.C. 154(b) by 0 days.

(21) Appl. No.: 09/739,493

(22) Filed: Dec. 18, 2000

(65) Prior Publication Data

US 2001/0052675 A1 Dec. 20, 2001

Related U.S. Application Data

(60) Provisional application No. 60/176,844, filed on Jan. 19, 2000.

(51) Int. Cl.[7] .............................................. F16L 21/025
(52) U.S. Cl. ...................... 277/604; 277/606; 277/607; 277/617; 277/636; 277/917; 285/4; 285/230; 249/39; 52/220.8
(58) Field of Search ................................. 277/604, 606, 277/607, 609, 676, 634, 636, 638, 917, 616, 617; 249/39; 52/220.8, 219; 285/42, 3, 4, 230

(56) References Cited

U.S. PATENT DOCUMENTS

| 3,493,237 A | | 2/1970 | Kleindienst | |
|---|---|---|---|---|
| 3,759,280 A | | 9/1973 | Swanson | |
| 3,800,486 A | * | 4/1974 | Harvey | ............................ 52/98 |
| 4,103,901 A | | 8/1978 | Ditcher | |
| 4,118,906 A | * | 10/1978 | Preuninger et al. | ............ 52/100 |
| 4,159,829 A | | 7/1979 | Ditcher | |
| 4,297,780 A | | 11/1981 | Temple | |
| 4,333,662 A | | 6/1982 | Jones | |
| 4,342,462 A | * | 8/1982 | Carlesimo | |
| 4,440,406 A | * | 4/1984 | Ericson | |
| 4,456,146 A | * | 6/1984 | Helms | ......................... 220/270 |
| 4,478,437 A | | 10/1984 | Skinner | |
| 4,854,543 A | * | 8/1989 | Daigle et al. | .................. 249/95 |
| 4,903,970 A | | 2/1990 | Ditcher et al. | |
| 4,951,914 A | * | 8/1990 | Meyers et al. | ................. 249/11 |
| 5,286,040 A | | 2/1994 | Gavin | |
| 5,451,081 A | * | 9/1995 | Kaucnik | ....................... 285/56 |
| 5,501,472 A | * | 3/1996 | Brancher et al. | |
| 5,529,312 A | | 6/1996 | Skinner et al. | |
| 5,601,291 A | * | 2/1997 | Gavin | |
| 5,624,123 A | | 4/1997 | Meyers | |
| 5,882,014 A | | 3/1999 | Gavin | |
| 5,941,535 A | | 8/1999 | Richard | |
| 5,967,567 A | * | 10/1999 | Nordstrom | ................ 285/139.1 |
| 5,979,908 A | | 11/1999 | Jones | |
| 6,161,873 A | * | 12/2000 | Munzenberger et al. | ........ 285/3 |

* cited by examiner

Primary Examiner—Anthony Knight
Assistant Examiner—Alison K. Pickard
(74) Attorney, Agent, or Firm—Robert A. Seemann

(57) ABSTRACT

A tubular wall sealed at a first end by an integrally molded annular wall, forming a cap, is cast in the concrete wall of a low pressure vessel, forming a sealed cavity in the concrete. One end of a rubber tubular gland wrapped sealingly around the outside of the second end of the tubular wall is sealed in the concrete by a radially extending cast-in anchor. The diameter of the other end of the rubber tube is smaller than the diameter of the tubular wall of the cap.

6 Claims, 4 Drawing Sheets

PIPE SEAL FOR CAST CONCRETE

This application claims the benefit of U.S. Provisional Application No. 60/176,844, filed Jan. 19, 2000.

BACKGROUND OF THE INVENTION

1. Field of the Invention

The invention pertains to cast-in-concrete seals for sealing between a concrete wall at an opening through the wall, and a pipe that extends into the opening in the wall. More specifically, the invention pertains to a seal that casts the cylindrical inner wall of the opening for at least a portion of the axial length of the opening plus an end of the opening, seals the concrete wall at the opening against low pressure liquid bearing upon the relatively large area of the opening, and includes a flexible low pressure gland for sealing between the inside of the wall opening and the outside of a pipe that extends into the opening.

2. Description of the Prior Art

The patented art is replete with designs for cast-in-place glands for concrete walls that seal between an opening in the wall and a pipe through the opening. The designs include tubular glands that may be extended from the opening to fit around the pipe outside the opening, and frustoconical glands having end-walls that tear out to fit different diameter pipes. The latter designs are made of elastomeric material that has low elasticity in order to resist the hydraulic pressure while sealing the opening. The low elasticity produces a moderately good seal around smooth wall pipe and not as good a seal when the appropriate diameter portion of the end-wall is torn out to fit the diameter of the pipe.

U.S. Pat. Nos. 3,759,280 patented Sep. 18, 1973 by H. Swanson; 5,529,312 patented Jun. 25, 1996 by Skinner et al.; and 5,941,535 patented Aug. 24, 1999 by J. Richard have designs that comprise a flexible elastomeric sleeve that has an outwardly flared flange on one end of the sleeve that is cast in the concrete wall around a hole through the wall. The other end of the sleeve is sealed by a circumferential clamp on the sleeve, around a pipe that extends into the hole in the wall.

SUMMARY OF THE INVENTION

It is one object of the invention to provide a cast-in concrete seal system that seals effectively around various diameter pipes.

It is another object of the invention that the cast-in concrete seal system is flexible to effectively seal around pipes of smooth wall, corrugated wall, and irregular wall surface wall.

It is another object of the invention that the cast-in-place seal system is stiff enough to seal the wall against low pressure hydraulic force over a relatively large diameter opening in the wall when no pipe is to be inserted through the opening.

A sealed aperture and low pressure pipe seal in a concrete wall of a low pressure vessel comprises a rigid cap that formed or cast the sealed aperture in the concrete wall. The cap comprises a first tubular wall cast in the concrete wall, having a first end and a second end, and a first annular wall sealingly closing the first end of the first tubular wall, the first tubular wall comprising a first diameter; the sealed aperture and low pressure pipe seal in the wall also comprises a unitary molded flexible tubular gland having a length, a first end and a second end, the first end of the tubular gland extending over the outer side of the second end of the first tubular wall sealingly on the first tubular wall and in the concrete wall, first means for anchoring the tubular gland in the concrete, extending radially outward from the first end of the tubular gland, cast in the concrete wall when the first tubular wall cast the aperture in the concrete wall, the second end of the tubular gland comprising a second diameter that is smaller than the first diameter of the first tubular wall.

A first form wall for casting the concrete wall, extends across a first side of the concrete wall and across the first annular wall adjacent to the first annular wall supporting the first annular wall against axial movement of the first annular wall toward the first form wall, a second form wall extending across a second side of the concrete wall, means for supporting the first annular wall axially and radially extend from the second form wall into the tubular gland and the first tubular wall.

In one arrangement of the invention a second annular wall integrally molded with the tubular gland on the second end of the tubular gland, seals the second end of the tubular gland. The second annular wall comprises an annular tear-out groove for opening the second end of the tubular gland for receiving a pipe in the tubular gland for sealing the second annular wall around a pipe, means for folding the tubular gland axially within the first tubular wall, extend from the first annular wall.

A second annular wall integrally molded with the tubular gland on the second end of the tubular gland, seal the second end of the tubular gland, the second annular wall comprises an annular tear-out groove for opening the second end of the tubular gland for receiving a pipe in the tubular gland for sealing the tubular gland around a pipe, means for folding the tubular gland axially within the first tubular wall extends from the first annular wall.

BRIEF DESCRIPTION OF THE DRAWINGS

In order that the invention will be more fully comprehended, it will now be described, by way of example, with reference to the accompanying drawings, in which.

DESCRIPTION OF THE PREFERRED EMBODIMENTS

Figure 1:
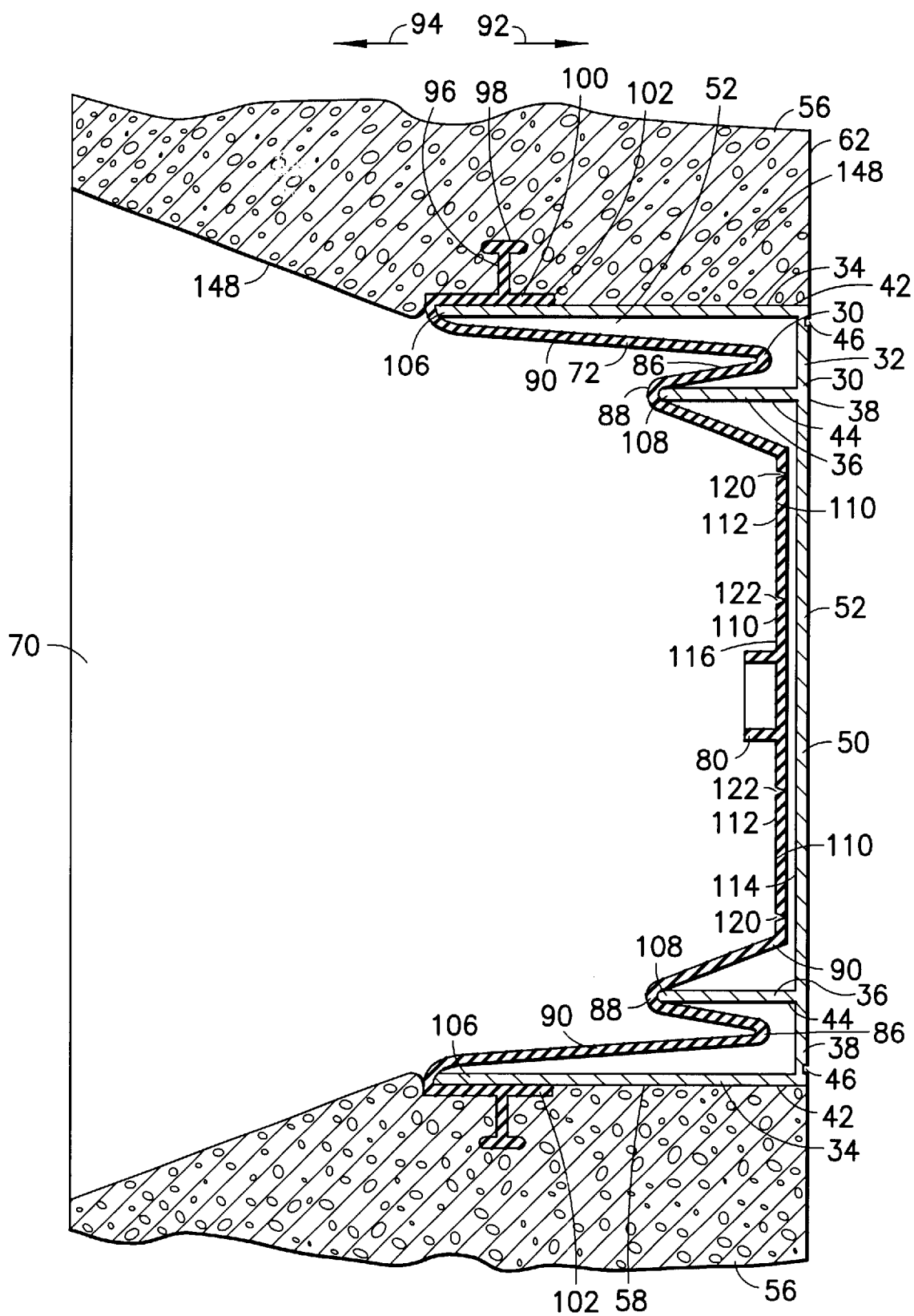
FIG. 1 is a cross section view of a seal of the invention cast in a concrete tank wall.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In FIG. 1, seal 30 comprises rigid element 32 and flexible element 72.

Rigid cylindrical wall 34 is connected to rigid cylindrical wall 36 by annular wall 38 at ends 42 and 44 respectively of walls 34 and 36. Rigid annular wall 50 seals end 44 of cylindrical wall 36.

Casting frame 52 is preferably rigid. It comprises annular walls 38 and 50, and rigid cylindrical wall 34. Annular walls 38 and 50 contribute to the casting wall that keeps liquid concrete out of circular opening 54 on the inner side 62 of concrete wall 56 of opening 70 through concrete wall 56 of a tank.

Cylindrical wall 34 forms the cylindrical inward portion 58 of the inner wall 148 of concrete of opening 70.

Rubber tubular wall 90, anchored by base body 100 at end 102 in the concrete wall by outwardly extending radial flange 96 and anchor 98 cast in the concrete around the opening, seals end 106 of cylindrical wall 34, folds 86 inward 92 toward annular wall 38, between cylindrical walls 34, 36, folds 88 outward 94 as it wraps over end 108 of cylindrical wall 36, angles frustoconically inward toward annular wall 50, and extends to integrally molded annular wall 110 which extends over the outward side 114 of annular wall 50, adjacent to wall 50.

Wall 34 supports base 100 against the radially inward force of the liquid concrete during molding of the tank wall.

Base 100 extends over an axial portion 130 of the radially outward side of wall 34. Base 100 may extend over the complete axial length of wall 34.

Wall 110 includes portions 112 and 116, and annular tear out rings 120 and 122 of reduced thickness. Wall 110 is preferably integrally molded with wall 90.

Portion 116 can be removed by tearing out at ring 122. Portions 112 and 116 can be removed simultaneously by tearing out at ring 120.

Figure 4:
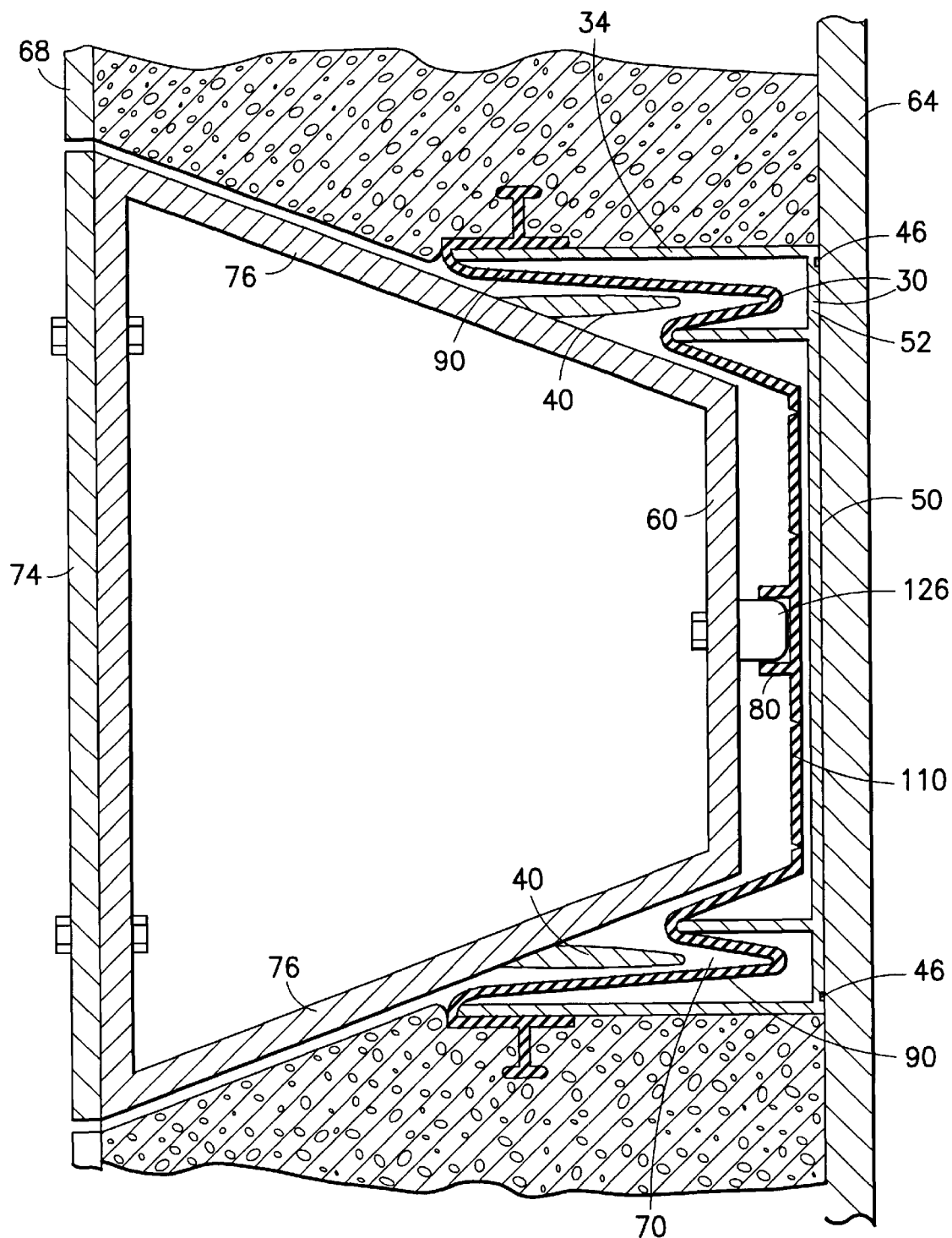
FIG. 4 is a cross section view of the seal of FIG. 1 casting a wall opening in concrete.

A conical guide 60 shown in FIG. 4 extends into opening 70 and includes centering guide 126 that contacts cup 80 so that guide 60 holds portion 110 adjacent to and centered on annular wall 50.

In one arrangement cylindrical wall 40 extends toward annular wall 38, in between concentric cylindrical walls 34 and 36 to urge element 72 into fold 86 when guide 60 is inserted into casting frame 52 before molding of concrete wall 56.

Figure 2:
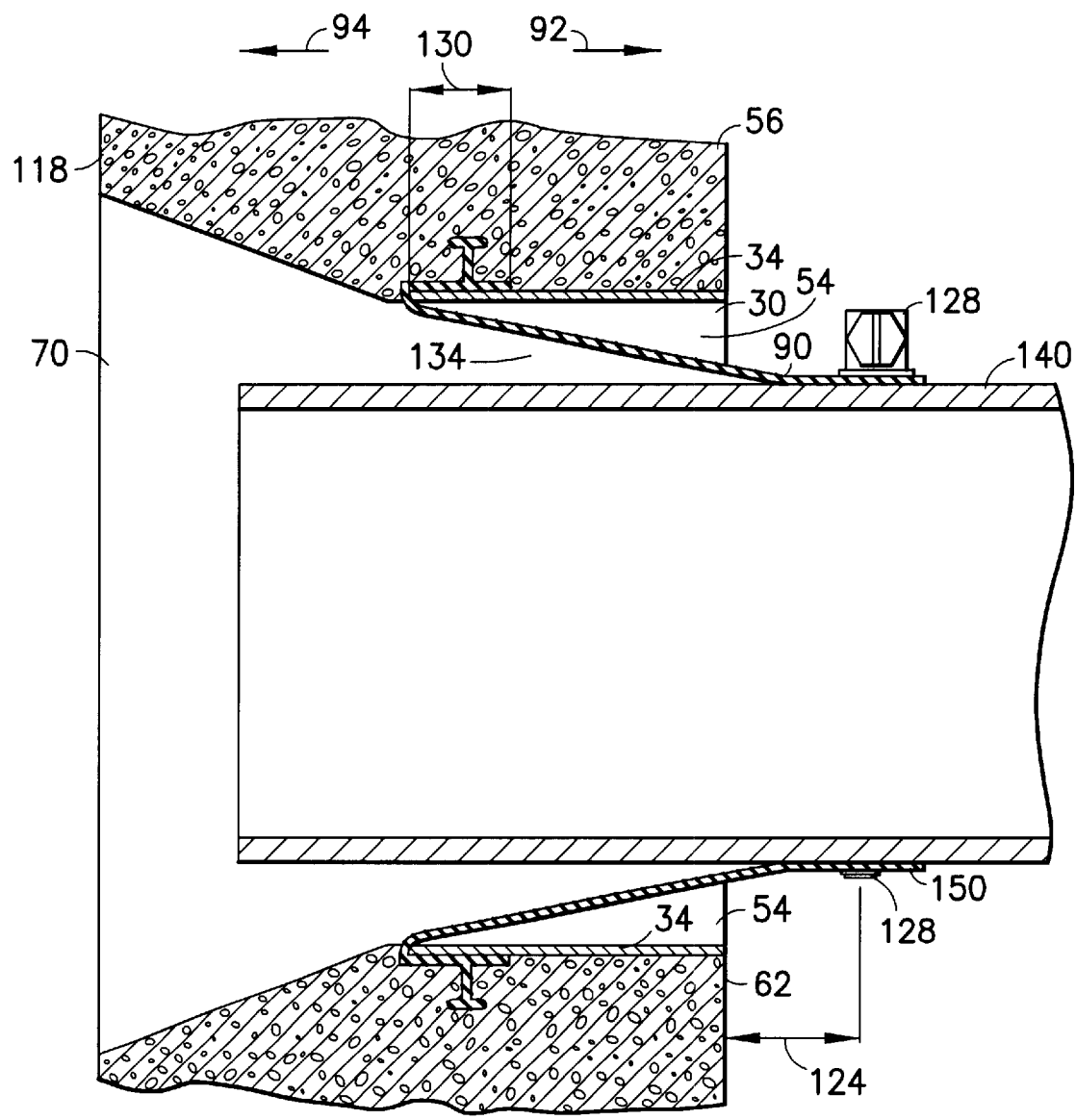
FIG. 2 is a cross section view of the seal of FIG. 1 with a portion of the seal broken out, and pipe that is pushed into the seal from the outer wall of the tank toward the inner wall of the tank, mounted in the seal.

In FIG. 2, annular walls 38 and 50 are broken away at weakened annular ring 46 from rigid cylindrical wall 34, out of wall 56. Pipe 140 is pushed into opening 70 from the outward side 118 of concrete wall 56. Rubber wall 90 is drawn inward 92 past inner side 62 of wall 56 by pipe 140. Outside of 124 opening end 54 of opening 70 in wall 56 stainless steel clamp 128 is tightened around rubber wall 90 on pipe 140 to complete the water tight seal 150 with the pipe.

Figure 3:
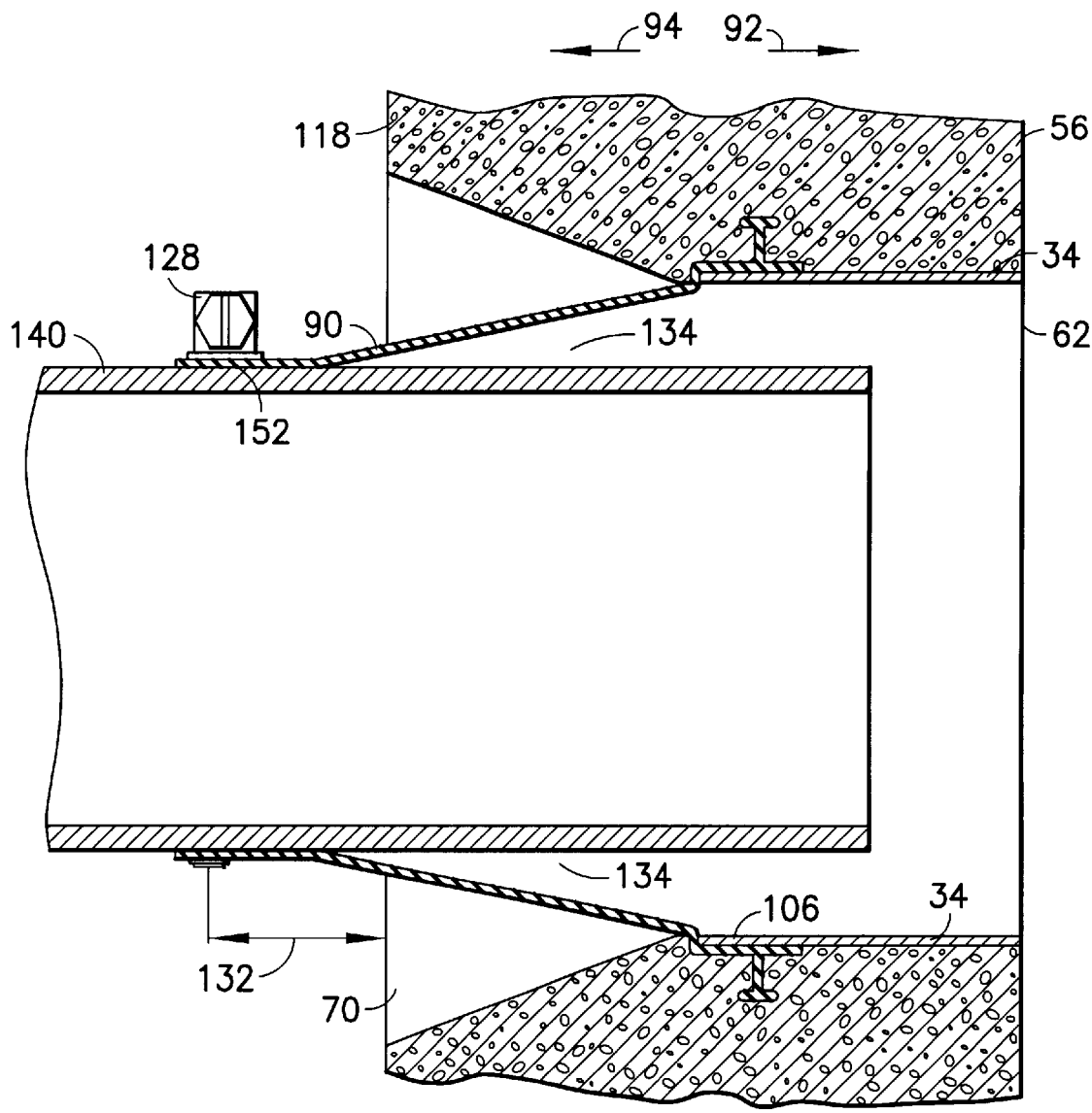
FIG. 3 is a cross section view of the seal of FIG. 1 with a portion of the seal broken out, and pipe that is pushed into the seal from the inner wall of the tank toward the outer wall of the tank, mounted in the seal.

In FIG. 3, annular walls 38 and 50 are broken away from rigid cylindrical wall 34, out of wall 56. Pipe 140 is pushed into opening 70 from the inner side 62 of the concrete wall. Rubber wall 90 is drawn outward 94 by pipe 140 into a frustoconical shape. Stainless steel clamp 128 is tightened around rubber wall 90 on pipe 140 to complete the water tight seal 152 with the pipe.

Pipe 140 is preferably clamped to wall 90 outside of 132 opening 70 in wall 56. Preferably there is some radial space over a portion of the arc between 134 the pipe and wall 90 at end 106 of wall 34.

Preferably wall 90 is uniform in thickness or is linear in change of thickness over its length when viewed in longitudinal cross sections, for the length of wall 90 around end 106 to annular tear out ring 120. Preferably when pulled it is relatively straight from end 106 to annular tear out ring 120. Preferably wall 90 is one continuous element from end 106 to tear out ring 120.

Preferably a small hole is made through wall 50 to release air caught between flexible element 72 and wall 50 when seal 30 is cast in the concrete.

In FIG. 4, seal 30 is mounted on conical guide 60 between wall form (casting) walls 64, 68. Conical wall 76 of guide 60 keeps the liquid concrete from extending over wall 90 radially inward of wall 34. Conical guide 60 holds casting frame 52 against form wall 64 to prevent liquid concrete from covering annular wall 50. Portion 74 of wall form wall 68 is removable, for example by bolts or hinge to wall 68, so that seal 30 can be installed in the wall mold mounted on conical guide 60, and then conical guide 60 can be removed from the hardened concrete wall either separately or in combination with wall form wall 68.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. An apparatus for casting a sealed aperture and low pressure pipe-seal in a concrete wall of a vessel comprising:

a rigid cap comprising a first tubular wall having a first end and a second end, a first annular wall sealingly closing the first end of said first tubular wall, said first tubular wall comprising a first diameter for casting a first opening in the concrete wall, a unitary molded flexible tubular gland having a first end and a second end, the first end of said tubular gland extending over the outer side of the second end of said first tubular wall sealingly on said first tubular wall, first means for anchoring said tubular gland in the concrete, extending radially outward from the first end of said tubular gland on said first tubular wall for being cast in the concrete wall when said first tubular wall casts the aperture in the concrete wall, the second end of said tubular gland comprising a second diameter that is smaller than the first diameter of said first tubular wall, a second annular wall integrally molded with said tubular gland on the second end of said tubular gland, sealing the second end of said tubular gland, said second annular wall comprising an annular tear-out groove for opening the second end of said tubular gland for receiving a pipe in said tubular gland for sealing said second annular wall around a pipe, means for folding said tubular gland axially within said first tubular wall, extending from said first annular wall.

2. An apparatus for casting a sealed aperture and low pressure pipe-seal in a concrete wall of a vessel comprising:

a rigid cap comprising a first tubular wall having a first end and a second end, a first annular wall sealingly closing the first end of said first tubular wall, said first tubular wall comprising a first diameter for casting a first opening in the concrete wall, a unitary molded flexible tubular gland having a first end and a second end, the first end of said tubular gland extending over the outer side of the second end of said first tubular wall sealingly on said first tubular wall, first means for anchoring said tubular gland in the concrete, extending radially outward from the first end of said tubular gland on said first tubular wall for being cast in the concrete wall when said first tubular wall casts the aperture in the concrete wall, the second end of said tubular gland comprising a second diameter that is smaller than the first diameter of said first tubular wall, a second annular wall integrally molded with said tubular gland on the second end of said tubular gland, sealing the second end of said tubular gland, said second annular wall comprising an annular tear-out groove for opening the second end of said tubular gland for receiving a pipe in said tubular gland for sealing said tubular gland around a pipe, means for folding said tubular gland axially within said first tubular wall, extending from said first annular wall.

3. In a concrete wall of a low pressure vessel, a sealed aperture and low pressure pipe seal comprising:

a rigid cap forming a sealed aperture in the concrete wall, comprising a first tubular wall cast in the concrete wall, having a first end and a second end, and a first annular wall sealingly closing the first end of said first tubular wall, said first tubular wall comprising a first diameter, a unitary molded flexible tubular gland having a length, a first end and a second end, the first end of said tubular gland extending over the outer side of the second end of said first tubular wall sealingly on said first tubular wall and in the concrete wall, first means for anchoring said tubular gland in the concrete, extending radially outward from the first end of said tubular gland, cast in the concrete wall when said first tubular wall cast the aperture in the concrete wall, the second end of said tubular gland comprising a second diameter that is smaller than the first diameter of said first tubular wall, a first form wall for casting the concrete wall, extending across a first side of said concrete wall and across said first annular wall adjacent to said first annular wall, for supporting said first annular wall against axial movement of said first annular wall toward said first form wall when said first tubular wall cast the aperture in the concrete wall, a second form wall extending across a second side of said concrete wall, means for supporting said first annular wall axially and radially extending from said second form wall into said tubular gland and said first tubular wall.

4. In a concrete wall of a low pressure vessel, a sealed aperture and low pressure pipe seal comprising:

a rigid cap forming a sealed aperture in the concrete wall, comprising a first tubular wall cast in the concrete wall, having a first end and a second end, and a first annular wall sealingly closing the first end of said first tubular wall, said first tubular wall comprising a first diameter, a unitary molded flexible tubular gland having a length, a first end and a second end, the first end of said tubular gland extending over the outer side of the second end of said first tubular wall sealingly on said first tubular wall and in the concrete wall, first means for anchoring said tubular gland in the concrete, extending radially outward from the first end of said tubular gland, cast in the concrete wall when said first tubular wall cast the aperture in the concrete wall, the second end of said tubular gland comprising a second diameter that is smaller than the first diameter of said first tubular wall, a second annular wall integrally molded with said tubular gland on the second end of said tubular gland, sealing the second end of said tubular gland, said second annular wall comprising an annular tear-out groove for opening the second end of said tubular gland for receiving a pipe in said tubular gland for sealing said second annular wall around a pipe, means for folding said tubular gland axially within said first tubular wall, extending from said first annular wall.

5. In a concrete wall of a low pressure vessel, a sealed aperture and low pressure pipe seal comprising:

a rigid cap forming a sealed aperture in the concrete wall, comprising a first tubular wall cast in the concrete wall, having a first end and a second end, and a first annular wall sealingly closing the first end of said first tubular wall, said first tubular wall comprising a first diameter, a unitary molded flexible tubular gland having a length, a first end and a second end, the first end of said tubular gland extending over the outer side of the second end of said first tubular wall sealingly on said first tubular wall and in the concrete wall, first means for anchoring said tubular gland in the concrete, extending radially outward from the first end of said tubular gland, cast in the concrete wall when said first tubular wall cast the aperture in the concrete wall, the second end of said tubular gland comprising a second diameter that is smaller than the first diameter of said first tubular wall, a second annular wall integrally molded with said tubular gland on the second end of said tubular gland, sealing the second end of said tubular gland, said second annular wall comprising an annular tear-out groove for opening the second end of said tubular gland for receiving a pipe in said tubular gland for sealing said tubular gland around a pipe, means for folding said tubular gland axially within said first tubular wall, extending from said first annular wall.

6. In a concrete wall of a low pressure vessel, a sealed aperture and low pressure pipe seal comprising:

a rigid cap forming a sealed aperture in the concrete wall, comprising a first tubular wall cast in the concrete wall, having a first end and a second end, and a first annular wall sealingly closing the first end of said first tubular wall, said first tubular wall comprising a first diameter, a unitary molded flexible tubular gland having a length, a first end and a second end, the first end of said tubular gland extending over the outer side of the second end of said first tubular wall sealingly on said first tubular wall and in the concrete wall, first means for anchoring said tubular gland in the concrete, extending radially outward from the first end of said tubular gland, cast in the concrete wall when said first tubular wall cast the aperture in the concrete wall, the second end of said tubular gland comprising a second diameter that is smaller than the first diameter of said first tubular wall, a first form wall for casting the concrete wall, extending across a first side of said concrete wall and across said first annular wall adjacent to said first end of said first tubular wall, a second form wall extending across a second side of said concrete wall, means for supporting said first annular wall axially and radially extending from said second form wall into said tubular gland and said first tubular wall.

* * * * *